United States Patent Office 3,261,748
Patented July 19, 1966

3,261,748
1,1,1,2-TETRAFLUOROETHANE ANESTHETIC
Eric R. Larsen, Midland, Mich., assignor to The Dow Chemical Company, Midland, Mich., a corporation of Delaware
No Drawing. Filed July 17, 1964, Ser. No. 383,502
7 Claims. (Cl. 167—52)

The present invention relates to animal husbandry and more particularly to improved methods and compositions for producing anesthesia in warm-blooded animals.

Various materials have been proposed for use as inhalation anesthetics in warm-blooded animals such as mammals, birds and poultry. However, such materials have not been entirely satisfactory. Many of the products have undesirable ignition properties whereby their use is difficult and not without hazard to the warm-blooded animal. Others of the materials are very potent and have an adverse effect upon the cardiovascular system and a toxic effect upon the kidney and liver or their functions. Many materials are extremely unpalatable and adversely effect the gastro-intestinal system bringing about bloating and nausea. Others have been characterized by prolonged emergence time and the induction of muscular rigidity. No materials as proposed today are entirely free of some adverse properties. Accordingly, there is a demand in animal husbandry for an inhalation anesthetic which is palatable to animals, which can be easily administered without danger to the animal and which is of intermediate potency and does not have an adverse effect upon the animal body.

It is the object of the present invention to provide an anesthetic for warm-blooded animals. Another objective is to provide an anesthetic of intermediate potency which can be administered to warm-blooded animals by inhalation. It is another objective of the present invention to provide an inhalation anesthetic which is palatable to animals and provides relaxation of skeletal muscle. A further objective of the present invention is the provision of an inhalation anesthetic which does not have any adverse effect on the cardiovascular system, the renal system or the liver or their functions. An additional object is to provide an inhalation anesthetic which provides for moment to moment control of the state of the animal, and which does not adversely affect the gastro-intestinal system, cause bloating or nausea. A still further object is to provide an inhalation anesthetic which has an exceptionally short emergence time. Another object is to provide an anesthesia from which the animal emerges without undesirable side effects such as lethargy, vomiting, narcolepsy, etc.

In accordance with the present invention, warm-blooded animals can be anesthetized by the administration of 1,1,1,2-tetrafluoroethane through inhalation. 1,1,1,2-tetrafluoroethane is a gas at atmospheric pressure which boils at −29° C. The compound is palatable and without substantial odor to animals. Further, the compound, when administered to animals by inhalation, gives a smooth and rapid production of full anesthesia without the occurrence of struggling, excitation, extensor rigidity, tremor, salivation, vomiting or other similar undesirable side effects either during the administration or following emergence. Additionally, the compound is of intermediate potency and does not have an adverse effect upon the cardiovascular system, upon the renal system or upon the liver. A further advantage is that the compound produces desirable relaxation of the muscle tissue of animals and does not bring about epinephrine sensitization of the heart. It is a major advantage of the present invention that the anesthetized animal emerges and revives from the anesthetized state in a very short period so that moment to moment control of the state of the animal can be obtained. A further advantage is that the animal emerges and revives from the anesthesia without nausea, lethargy, narcolepsy or ataxia. Such a favorable group of properties facilitates the study and evaluation of the effect of chemical materials upon the autonomic, cardiovascular and muscular systems of animals such as cats, dogs, horses, cows, pigs, rats and poultry and birds.

The administration by inhalation of the 1,1,1,2-tetrafluoroethane compound to the animals in anesthetic amounts is critical and essential for the practice of the present invention. This is readily accomplished by the administration of the compound to the animals during normal and regular respiration. In such operations, good results are obtained when the compound comprises from 20 to 90 percent by volume of the entire respired gases. Such respired gases should contain at least from 5 to 10 percent by volume of oxygen to furnish the oxygen requirement of the animal. Where the tetrafluoroethane compound is administered with air, good results are obtained when the compound comprises from 20 to 50 percent by volume of the inspired mixture. In a preferred embodiment of the present invention, the compound is administered to the animal in admixture with oxygen. In such operation, it is preferred that the inspired mixture contain from about 25 to 75 or to 85 percent by volume of the tetrafluoroethane compound. Mixtures containing from 30 to 35 to 40 to 45 to 50 to 55 to 60 to 70 percent by volume of oxygen or a combination of such percentages have been found convenient and adapt themselves for convenient usage.

Certain mixtures of 1,1,1,2-tetrafluoroethane are flammable and can be ignited under standard conditions of temperature and pressure by a spark. These are mixtures of from about 18 to 70 percent by volume of tetrafluoroethane in oxygen. Thus, mixtures containing from about 70 to 90 percent or from about 72 to 90 percent by volume of 1,1,1,2-tetrafluoroethane in oxygen together with their use as herein described constitute preferred embodiments of the present invention.

Additionally, certain mixtures of 1,1,1,2-tetrafluoroethane, oxygen and nitrogen and/or helium are non-flammable. For example, mixtures of 1,1,1,2-tetrafluoroethane, oxygen and nitrogen wherein the nitrogen is present in the amount of at least 38 percent by volume of the three components in said mixture are non-flammable. Thus, mixtures of 1,1,1,2-tetrafluoroethane, oxygen and nitrogen and their use as herein described wherein the tetrafluoroethane is present in the amount of at least 20 percent by volume, the oxygen present in the amount of at least 10 percent and the nitrogen present in the amount of at least 38 percent constitute preferred embodiments of the invention. Among such preferred embodiments are mixtures wherein the tetrafluoroethane compound is present in the amount of from 30 to 53 percent by volume. Such mixtures are particularly useful for the accomplishment of the present methods.

Certain other mixtures of 1,1,1,2-tetrafluoroethane, oxygen and nitrogen and wherein the nitrogen is present in smaller amounts are also non-flammable and constitute preferred embodiments. Representative mixtures are shown in the following table:

[Percent by volume of the ingredients]

| 1,1,1,2-Tetra-fluoroethane | Oxygen | Nitrogen |
|---|---|---|
| 70 | 28 | 2 |
| 68 | 27 | 5 |
| 65 | 25 | 10 |
| 63 | 24.5 | 12.5 |
| 60 | 23.5 | 16.5 |
| 58 | 23 | 19 |
| 55 | 23 | 22 |
| 52 | 23.5 | 24.5 |
| 50 | 23.5 | 26.5 |
| 47 | 24 | 29 |
| 45 | 25 | 30 |
| 42 | 26 | 32 |
| 40 | 27 | 33 |
| 37 | 28 | 35 |
| 35 | 28 | 37 |
| 32 | 31 | 37 |
| 30 | 32 | 38 |
| 27 | 35 | 38 |
| 25 | 38 | 37 |

Similar mixtures wherein the concentration of the 1,1,1,2-tetrafluoroethane compound is intermediate the values shown in the table are also preferred. In such compositions, the oxygen and nitrogen concentrations are also intermediate the corresponding values shown in the table and are determined for any new concentration of 1,1,1,2-tetrafluoroethane by conventional interpolation procedures. In such procedures, $\Delta E$ is allowed to represent the difference between any new concentration of 1,1,1,2-tetrafluoroethane and the closest concentration of tetrafluoroethane shown in the table. $\Delta E'$ is allowed to represent the difference between the two tetrafluoroethane concentrations shown in the table which are adjacent to the new tetrafluoroethane concentration. Similar definitions are given with regard to corresponding values of oxygen and nitrogen, namely $\Delta O$, $\Delta O'$, $\Delta N$ and $\Delta N'$. The proportionality of $\Delta E/\Delta E' = \Delta O/\Delta O' = \Delta N/\Delta N'$ provides for the interpolation and determination of the oxygen and nitrogen concentrations corresponding to the new concentration of the tetrafluoroethane compound.

In any of the compositions described in the table or in the preceding paragraph, the relative amounts of the tetrafluoroethane compound and oxygen can be changed provided the amount of the tetrafluoroethane compound is not decreased. For example, compositions containing about 45 percent by volume of tetrafluoroethane and 25 percent of oxygen (a total of 70 percent by volume of said mixture) with about 30 percent by volume of nitrogen can contain 50 percent by volume of tetrafluoroethane, 20 percent of oxygen and 30 percent of nitrogen, or 55 percent by volume of tetrafluoroethane, 10 percent of oxygen and 30 percent of nitrogen. All of these compositions as described in this paragraph are non-flammable and the compositions and their use as described herein constitute preferred embodiments of the present invention.

In operations exactly comparable to those in the preceding paragraphs, corresponding compositions are prepared containing the same concentration of 1,1,1,2-tetrafluoroethane and oxygen but wherein the concentration of nitrogen is replaced with a corresponding concentration of helium.

The tetrafluoroethane can also be administered in combination with other inhalation anesthesias for horses, dogs, cats, pigs, canaries, geese, chickens, cows, swans, ducks, rabbits, turkeys, bears, etc. Representative inhalation anesthesias include nitrous oxide, methoxyflurane and halothane.

In a representative operation, 1,1,1,2-tetrafluoroethane is administered by inhalation to groups of mice during regular respiration. In such operations, the mice are provided, as the entire respiratory gases, a mixture of 45 percent by volume of air and 55 percent by volume of 1,1,1,2-tetrafluoroethane. When breathing such mixture, the mice are fully anesthetized in about 10 seconds. After fifteen minutes, the mice are placed in an environment wherein air is the sole respiratory medium. The mice recover and emerge from the full anesthetic state within ten seconds. During the production of the anesthetic state and during the recovery and period subsequent thereto, there is observed no salivation, struggling, extensor rigidity, excitation, vomiting, lethargy or ataxia.

In further operations, various mixtures of 1,1,1,2-tetrafluoroethane and oxygen are provided as the sole respiratory gases for different groups of mice. The mice are administered the various mixtures by inhalation as previously described for a period of 15 minutes. Following this period, the mice are returned to an environment wherein air is the sole respiratory gas. The times required for reaching the full anesthetic state together with the time required for recovery and emergence are set forth in the following table:

| Concentration of 1,1,1,2-Tetrafluoroethane in Percent by Volume | Induction Time | Emergence Time, seconds |
|---|---|---|
| 20 | 9 minutes | 10 |
| 30 | 2 minutes | 9 |
| 40 | 1.5 minutes | 10 |
| 50 | 17 seconds | 5 |
| 60 | 3 seconds | 6 |
| 70 | 2 seconds | 9 |
| 90 | 2 seconds | 12 |

In additional operations, dogs weighing about 8.5 kilograms are anesthetized with a mixture containing 50 percent by volume of 1,1,1,2-tetrafluoroethane in oxygen. The time required for the production of full anesthesia is one-half to one minute. After the dogs have been maintained in full anesthesia for a period of about one-half hour, the dogs are allowed to breathe room air. Within about 30 seconds, the dogs emerge from the anesthetic state and gain the standing position. During the induction and following the emergence, there is observed no salivation, struggling, convulsive activity, vomiting or defecation.

In further operations, parakeets are anesthetized by placing them in an enclosure wherein the sole respiratory gases consist of a mixture of 45 percent 1,1,1,2-tetrafluoroethane and 55 percent air by volume. The parakeets, when breathing such a mixture, are fully anesthetized within 10 seconds. After 2 minutes in the anesthetic-air mixture, the parakeets are removed and placed in an environment wherein air is the sole respiratory medium. Upon removal from the anesthetic medium, the parakeets emerge from the anesthetic state in about 10 seconds. Following emergence, the birds are alert and their behavior not different from a check group of parakeets which had not been anesthetized.

In a further operation, a group of five mice is placed in a small chamber provided with an inlet and an outlet whereby the respiratory gases within the chamber can be quickly modified and controlled as desired. A mixture of 50 percent by volume of 1,1,1,2-tetrafluoroethane and 50 percent of oxygen is swept through the chamber to provide such mixture as the entire respiratory gases. After three minutes, the chamber is quickly swept out with air to provide air as the entire respiratory gas. This same cycle is repeated five times with a one minute interval between each cycle. During the operations, the mice are observed and the average induction and emergence times obtained. The average induction time is found to be about 22 seconds with an average emergence time of about 9 seconds. During the production of the anesthetic state and during the recovery and subsequent thereto, there is observed no salivation, extensor rigidity, excitation, vomiting, lethargy or ataxia.

In an additional operation, an adult cat is anesthetized with a mixture containing 60 percent by volume of 1,1,1,2-tetrafluoroethane, 20 percent of oxygen and 20 percent of helium. The time required for the production of full anesthesia is about ½ minute. After the cat had been maintained in full anesthesia for a period of about 5 minutes, the animal was allowed to breathe room air. Within about 20 seconds, the cat emerges from the anesthetic state and gains the standing position. During the induction and following the emergence, there is observed no salivation, struggling, vomiting, convulsive activity or defecation.

The 1,1,1,2-tetrafluoroethane compound is prepared by known procedures wherein anhydrous hydrogen fluoride and trichloroethylene are contacted with a basic chromium fluoride catalyst for 2 to 10 seconds at between 300° and 400° C. Following the reaction, gases were passed through a water scrubber, cooled, dried and condensed in a Dry Ice-acetone cooled trap.

What is claimed is:

1. The process which comprises administering 1,1,1,2-tetrafluoroethane by inhalation to warm-blooded animals in anesthetic amounts.
2. The process which comprises administering to warm-blooded animals by inhalation a composition comprising from 20 to 90 percent by volume of 1,1,1,2-tetrafluoroethane in admixture with oxygen.
3. The process claimed in claim 2 wherein the composition contains at least 38 percent by volume of nitrogen.
4. The process claimed in claim 2 wherein the composition contains at least 45 percent by volume of 1,1,1,2-tetrafluoroethane and at least 30 percent of nitrogen.
5. A composition comprising from 20 to 90 percent by volume of 1,1,1,2-tetrafluoroethane in admixture with oxygen.
6. A composition claimed in claim 5 wherein the composition contains at least 38 percent by volume of nitrogen.
7. A composition claimed in claim 5 wherein the composition contains at least 45 percent by volume of 1,1,1,2-tetrafluoroethane and at least 30 percent of nitrogen.

References Cited by the Examiner

UNITED STATES PATENTS 3,104,202  9/1963  Larsen _____ 167—52

FOREIGN PATENTS 615,803  3/1961  Canada.

OTHER REFERENCES

Poznak et al., Toxicology and Applied Pharmacology, vol. 2, pp. 363 to 373, 1960.

Robbins, J. Pharmacology and Exp't Therapy, vol. 83, 1946, pp. 197 to 204.

JULIAN S. LEVITT, *Primary Examiner.*

J. D. GOLDBERG, *Assistant Examiner.*